(12) United States Patent
Feng

(10) Patent No.: US 11,571,054 B2
(45) Date of Patent: Feb. 7, 2023

(54) HAIR PERMING DEVICE AND ITS TEMPERATURE CONTROL CIRCUIT

(71) Applicant: Shenzhen Lady Merry Technology Co., Ltd., Guangdong (CN)

(72) Inventor: Ye Feng, Guangdong (CN)

(*) Notice: Subject to any disclaimer, the term of this patent is extended or adjusted under 35 U.S.C. 154(b) by 725 days.

(21) Appl. No.: 16/556,226

(22) Filed: Aug. 30, 2019

(65) Prior Publication Data

US 2020/0221844 A1 Jul. 16, 2020

(30) Foreign Application Priority Data

Jan. 14, 2019 (CN) .......................... 201920056975.4

(51) Int. Cl.
*A45D 1/04* (2006.01)
*G05D 23/20* (2006.01)

(52) U.S. Cl.
CPC ............ *A45D 1/04* (2013.01); *G05D 23/2036* (2013.01); *G05D 23/2039* (2013.01)

(58) Field of Classification Search
CPC ........ A45D 1/04; A45D 1/28; G05D 23/2036; G05D 23/2039
See application file for complete search history.

(56) References Cited

U.S. PATENT DOCUMENTS

| 11,250,998 B2* | 2/2022 | Feng | A45D 2/001 |
| 2014/0111899 A1* | 4/2014 | Lin | H02H 3/08 361/93.4 |
| 2022/0070054 A1* | 3/2022 | He | H04L 41/0677 |

* cited by examiner

*Primary Examiner* — Marc E Norman

(57) ABSTRACT

A hair perming device and its temperature control circuit are disclosed. The temperature control circuit for a hair perming device is electrically connected with a heater of the hair penning device and comprises a main control module and a trigger module. The main control module controls the trigger module to be switched on such that a control signal outputted by the main control module can be sent to the heater for heating, and meanwhile for detects a working state of the trigger module. When a failure of the trigger module is detected, the main control module controls the trigger module to be switched off such that a continuous heating of the heater is stopped. When a failure of the trigger module is detected, the electrical power supply path of the heater is disconnected, and a continuous heating of the heater is stopped for avoiding excessive high temperature.

17 Claims, 3 Drawing Sheets

HAIR PERMING DEVICE AND ITS TEMPERATURE CONTROL CIRCUIT

TECHNICAL FIELD

The present disclosure relates generally to a technical field of hairdressing apparatus, and more particularly, to a hair perming device and its temperature control circuit.

BACKGROUND

The hair straightener and hair curler are the necessary hairdressing apparatus for the barber shops. For example, the hair straightener usually consists of two clamping plates with a heater arranged therebetween to shape the hair by heating. In order to prevent excessively high temperature, a temperature control circuit is needed to control the heating time of the heater, so as to control the temperature of the clamping plates, thus avoiding hair damage.

At present, PTC (positive temperature coefficient heater) or MCH (ceramic heater) are commonly used as the materials of heater in the hair straightener and hair curler, at the same time, the unidirectional and bidirectional silicon controlled rectifier can be used as the switching devices of the control board for controlling the power supplying state of the heater. When the hair straightener is in use, some reasons may result in the circuit failure, that is, when the silicon controlled rectifier is short-circuited, the heater would heat the clamping plates continuously and their temperature would go beyond control. The heater may heat the clamping plates to 270 degrees Celsius or even higher until the hair straightener and hair curler are damaged.

Excessively high temperature can easily cause damage to human hair and body, especially when the temperature of MCH (ceramic heater) is out of control, as its temperature will be higher and may cause fire. Therefore, it is necessary to provide a reliable temperature control circuit for the hair perming device.

SUMMARY

The object of the present application is to provide a temperature control circuit for a hair penning device, which is capable of switching off a power supply of a heater for stopping the heater from continuous heating to avoid excessively high temperature of the heater when the temperature control operation fails, aiming at the shortcomings of the above existing technologies.

In one aspect, a temperature control circuit for a hair penning device electrically connected with a heater of the hair periling device is provided, which comprising a main control module and a trigger module, wherein the main control module is used for controlling the trigger module to be switched on such that a control signal outputted by the main control module can be sent to the heater for heating, and meanwhile the main control module is used for detecting a working state of the trigger module, wherein when a failure of the trigger module is detected, the main control module is used for controlling the trigger module to be switched off such that a continuous heating of the heater is stopped.

In a preferable embodiment, the trigger module comprises two trigger units, and when the main control module detects that one of the two trigger units fails, the other one trigger unit is controlled to be switched off by the main control module, such that the continuous heating of the heater is stopped.

Furthermore, the two trigger units comprise a first trigger unit and a second trigger unit, wherein a first terminal of the first trigger unit is connected to the main control module and a first terminal of the second trigger unit is also connected to the main control module, a second terminal of the first trigger unit is grounded, and a third terminal of the first trigger unit is connected to a second terminal of the second trigger unit, while a third terminal of the second trigger unit is connected to the heater.

In a preferable embodiment, the first trigger unit comprises a first resistor, a second resistor, a first capacitor, a second capacitor and a first bidirectional silicon controlled rectifier, wherein a first terminal of the first resistor is the first terminal of the first trigger unit which is connected to a first control terminal of the main control module, a second terminal of the first resistor is connected to a control electrode of the first bidirectional silicon controlled rectifier, a first terminal of the second capacitor and a first terminal of the second resistor via the first capacitor, wherein a second terminal of the first bidirectional silicon controlled rectifier is the second terminal of the first trigger unit which is connected to a second terminal of the second capacitor, a second terminal of the second resistor and a MCH detection terminal of the main control module, wherein a first terminal of first bidirectional silicon controlled rectifier is the third terminal of the first trigger unit which is connected to the second terminal of the second trigger unit.

In a preferable embodiment, the second trigger unit comprises a third resistor, a fourth resistor, a third capacitor, a fourth capacitor and a second bidirectional silicon controlled rectifier, wherein a first terminal of the third resistor is the first terminal of the second trigger unit which is connected to a second control terminal of the main control module and a second terminal of the third resistor is connected to a control electrode of the second bidirectional silicon controlled rectifier, a first terminal of the fourth capacitor and a first terminal of the fourth resistor via the third capacitor, wherein a second terminal of the second bidirectional silicon controlled rectifier is the second terminal of the second trigger unit which is connected to a second terminal of the fourth capacitor, a second terminal of the fourth resistor and the first terminal of first bidirectional silicon controlled rectifier, wherein a first terminal of the second bidirectional silicon controlled rectifier is the third terminal of the second trigger unit which is connected a first terminal of the heater whose second terminal is further connected to a power supply input of the hair perming device.

In a preferable embodiment, the main control module comprises a MCU chip and a fifth resistor, wherein an E0/A2/P02 pin of the MCU chip is the second control terminal of the main control module which is connected to the first terminal of the third resistor, an E1/A8/P22 pin of the MCU chip is the first control terminal of the main control module which is connected to the first terminal of the first resistor and an A5/P05 pin of the MCU chip is connected to the second terminal of the first bidirectional silicon controlled rectifier via the fifth resistor.

In a preferable embodiment, the trigger module comprises at least three trigger units, and when the main control module detects that one of the three trigger units fails, the other trigger units are controlled to be switched off by the main control module, such that the continuous heating of the heater is stopped.

In a further aspect, a hair perming device is provided, which comprising a power supply input, a heater and a temperature control circuit discussed above, wherein the heater is connected in series between the power supply input and the temperature control circuit.

In a preferable embodiment, the hair perming device is a hair straightener or a hair curler.

In a preferable embodiment, the hair penning device further comprises a voltage lowering module used for lowering a AC voltage to a working voltage of the MCU chip of the hair perming device, wherein one terminal of the voltage lowering module is connected to the power supply input of the hair penning device, and another terminal of the voltage lowering module is connected to a VDD pin of the MCU chip.

In a preferable embodiment, the hair penning device further comprises an input interaction module for receiving user control instructions, connecting to an A6/P06 pin of the MCU chip of the hair penning device.

Compared with the existing technology, the temperature control circuit for a hair penning device provided by the present application is electrically connected with the heater of the hair penning device. The temperature control circuit comprises a main control module and a trigger module, wherein the main control module is used for controlling the trigger module to be switched on such that a control signal outputted by the main control module can be sent to the heater for heating, and meanwhile the main control module is used for detecting a working state of the trigger module, wherein when a failure of the trigger module is detected, the main control module is used for controlling the trigger module to be switched off such that a continuous heating of the heater is stopped. When a failure of the trigger module is detected, that is the switch elements in the trigger module fail, the trigger module is controlled to be switched off such that the electrical power supply path of the heater is disconnected, and a continuous heating of the heater is stopped for avoiding excessive high temperature of the heater. When the malfunction is eliminated, the heater can continue working. In such a way, the hair penning device can work stably and reliably, and avoid damaging customers' hair or even burns them, and avoid causing fires.

DETAILED DESCRIPTION OF THE PREFERRED EMBODIMENT

To make the technical feature, objective and effect of the present application be understood more clearly, now the specific implementation of the present application is described in detail with reference to the accompanying drawings and embodiments.

It should be noted that when a part is referred to as "mounted", "fixed" or "arranged" on another part, it can be directly on another part or indirectly on such another part via a possibly and simultaneously presented middle part. When a part is referred to as "connected" to another part, it can be connected directly to another part or indirectly connected to such another part via a possibly and simultaneously presented middle part.

It should also be noted that the expressions of left, right, upper and lower directions in the embodiments of the present application are only relative concepts or refer to the normal use of the product, and should not be considered restrictive.

Figure 1:
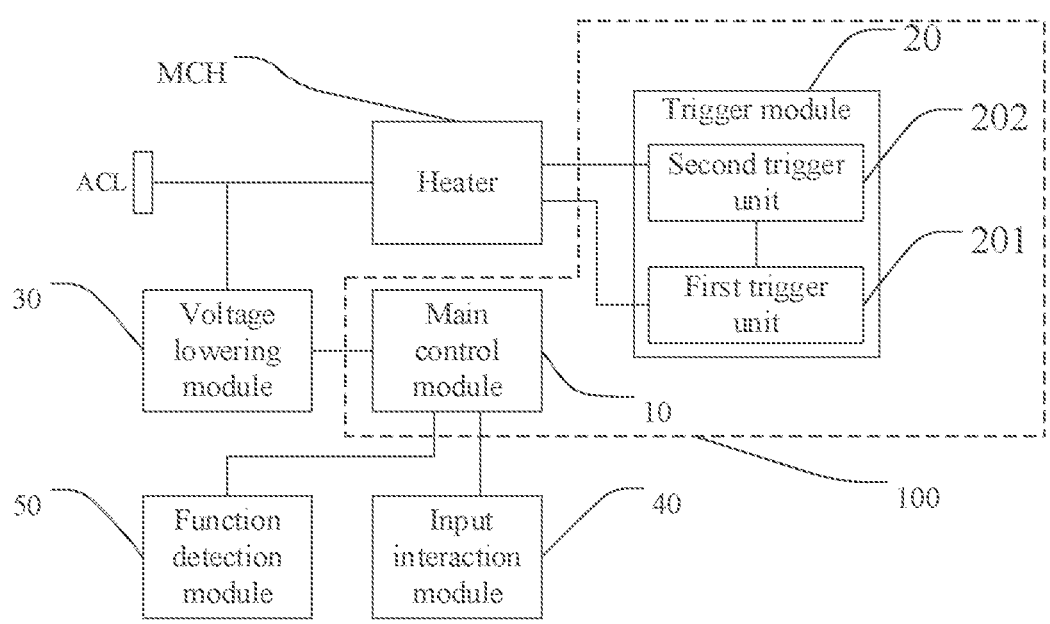
FIG. 1 is a schematic diagram of the temperature control circuit for a hair penning device according to a first preferable embodiment of the present application.

As shown in FIG. 1, the present application has provided a temperature control circuit 100 for a hair perming device electrically connected with a heater MCH of the hair penning device. The temperature control circuit 100 comprises a main control module 10 and a trigger module 20, wherein the main control module 10 is connected to the heater MCH via the trigger module 20, while the heater MCH is connected to the live wire of the AC voltage.

The main control module 10 is used for controlling the trigger module 20 to be switched on such that a control signal outputted by the main control module 10 can be sent to the heater for heating, and meanwhile the main control module is used for detecting a working state of the trigger module 20. When a failure of the trigger module 20 is detected, the main control module 10 is used for controlling the trigger module 20 to be switched off such that a continuous heating of the heater is stopped.

When a failure of the trigger module 20 is detected, that is the switch elements in the trigger module 20 fail, the trigger module 20 is controlled to be switched off such that the electrical power supply path of the heater MCH is disconnected, and a continuous heating of the heater MCH is stopped for avoiding excessive high temperature of the heater MCH. When the malfunction is eliminated, the heater MCH can continue working. In such a way, the hair penning device can work stably and reliably, and avoid damaging customers' hair or even burns them, and avoid causing fires.

In the present embodiment, the trigger module 20 comprises two trigger units 201, 202 connected in series between the heater MCH and the ground. When the main control module 10 detects that one of the two trigger units 201, 202 fails, the other one trigger unit is controlled to be switched off by the main control module 10, such that the continuous heating of the heater MCH is stopped.

Furthermore, the two trigger units comprise a first trigger unit 201 and a second trigger unit 202, wherein the first terminals of the first trigger unit 201 and the second trigger unit 202 are connected to the main control module 10, the second terminal of the first trigger unit 201 is grounded, and the third terminal of the first trigger unit 201 is connected to the second terminal of the second trigger unit 202, while a third terminal of the second trigger unit 202 is connected to the heater MCH.

The first trigger unit 201 comprises a first resistor R1, a second resistor R2, a first capacitor C1, a second capacitor C2 and a first bidirectional silicon controlled rectifier TRIAC1. The first terminal of the first resistor R1 is the first terminal of the first trigger unit 201 which is connected to the first control terminal of the main control module 10, the second terminal of the first resistor R1 is connected to a control electrode of the first bidirectional silicon controlled rectifier TRIAC1, the first terminal of the second capacitor C2 and the first terminal of the second resistor R2 via the first capacitor C1. The second terminal of the first bidirectional silicon controlled rectifier TRIAC1 is the second terminal of the first trigger unit 201 which is connected to the second terminal of the second capacitor C2, the second terminal of the second resistor R2 and the MCH detection terminal of the main control module 10, wherein the first terminal of first bidirectional silicon controlled rectifier TRIAC1 is the third terminal of the first trigger unit 201 which is connected to the second terminal of the second trigger unit 202.

The second trigger unit 202 comprises a third resistor R3, a fourth resistor R4, a third capacitor C3, a fourth capacitor C4 and a second bidirectional silicon controlled rectifier TRIAC2. The first terminal of the third resistor R3 is the first terminal of the second trigger unit 202 which is connected to the second control terminal of the main control module 10, the second terminal of the third resistor R3 is connected to a control electrode of the second bidirectional silicon controlled rectifier TRIAC2, the first terminal of the fourth capacitor C4 and the first terminal of the fourth resistor R4 via the third capacitor C2. The second terminal of the second bidirectional silicon controlled rectifier TRIAC2 is the second terminal of the second trigger unit 202 which is connected to the second terminal of the fourth capacitor C4, the second terminal of the fourth resistor R4 and the first terminal of first bidirectional silicon controlled rectifier TRIAC1. The first terminal of the second bidirectional silicon controlled rectifier TRIAC2 is the third terminal of the second trigger unit 202 which is connected one terminal of the heater MCH which is further connected to a power supply input of the hair perming device via the other terminal.

In the present application, two bidirectional silicon controlled rectifiers are implemented to realize the double-tube controls and make sure that the temperature control circuit 100 would not fail, thus preventing the heater from continuous heating, damaging the customer's hair and skin and causing fire. Of course, other types of switching devices, such as unidirectional silicon controlled rectifier, etc. also can be provided.

Figure 2:
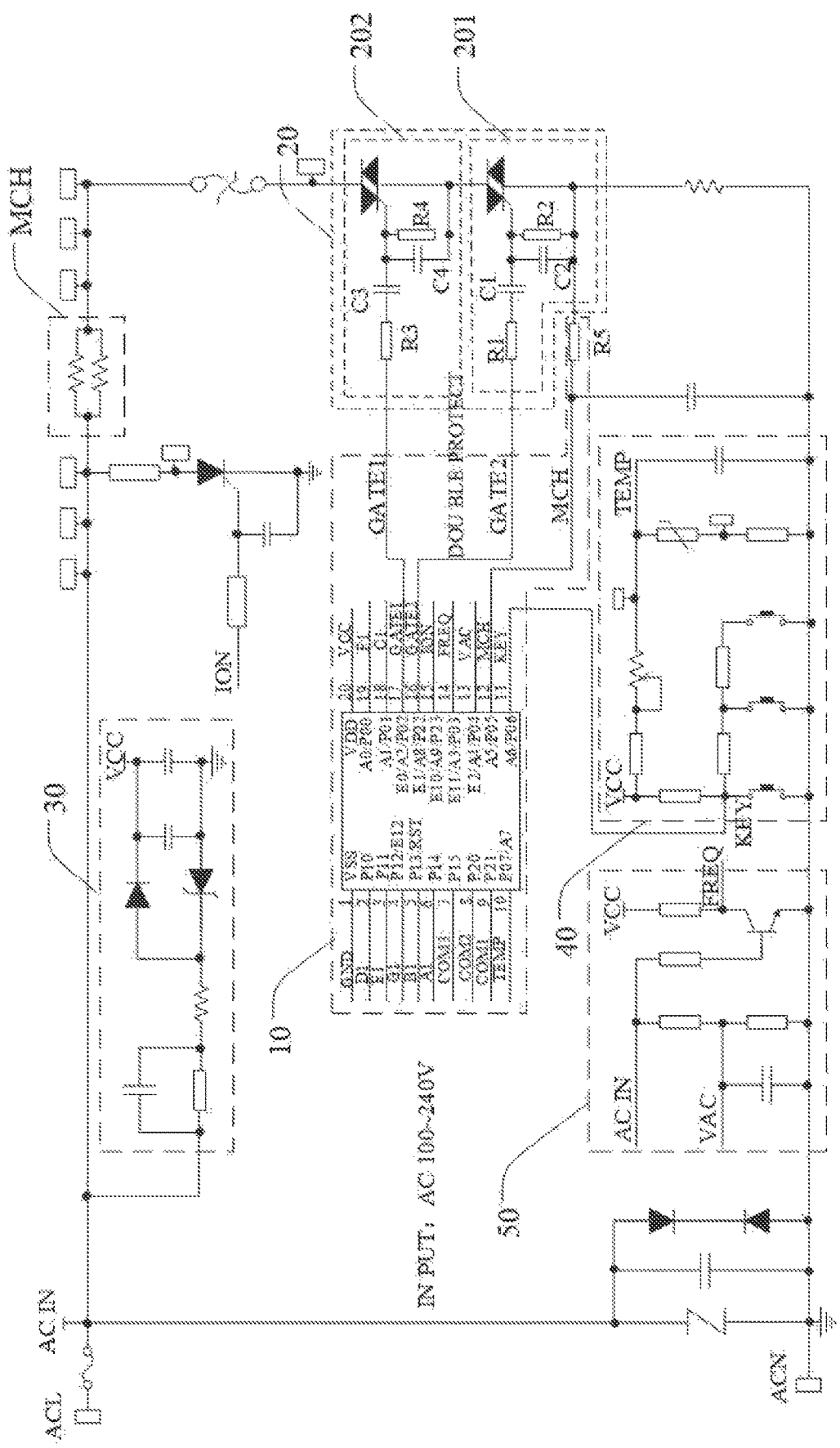
FIG. 2 is an electric schematic diagram of the temperature control circuit for a hair penning device according to the present application.

When further referring FIG. 2, the main control module 10 comprises a MCU (Microcontroller Unit) chip U1 and a fifth resistor R5, wherein a first pin (the E0/A2/P02 pin as shown in FIG. 2) of the MCU chip U1 is the second control terminal of the main control module 10 which is connected to the first terminal of the third resistor R3, a second pin (the E1/A8/P22 pin as shown in FIG. 2) of the MCU chip U1 is the first control terminal of the main control module 10 which is connected to the first terminal of the first resistor R1, and a third pin (the A5/P05 pin as shown in FIG. 2) of the MCU chip U1 is the connected to the second terminal of the first bidirectional silicon controlled rectifier TRIAC1 via the fifth resistor R5. The MCU chip U1 can employ an integrated chip of A94B1144. Of course, the present application also can employ chips with other functions, as if the detection and control function of the temperature control circuit 100 can be achieved, and the present application makes no restriction for the specific type of the chips.

The fifth resistor R5 is used as a detection circuit for detecting the voltage of the heater MCH and feeding the voltage back to the MCU chip U1 which is further used for judging whether the heater MCH works abnormally. When the heater MCH generates heat in an abnormal way, which means one of the first bidirectional silicon controlled rectifier TRIAC1 and the second bidirectional silicon controlled rectifier TRIAC2 fails, then a GATE 1 signal and a GATE2 signal are respectively outputted from the E0/A2/P02 pin and the E1/A8/P22 pin of the MCU chip U1 to switch off the undamaged bidirectional silicon controlled rectifier for disconnecting the electrical power supply path of the heater MCH.

The two bidirectional silicon controlled rectifiers connected in series can guarantee the reliable work of the hair perming device, and can also give a voltage division by the arrangement of the two bidirectional silicon controlled rectifiers, thus effectively improving the stress of the bidirectional silicon controlled rectifier and prolonging the service life of the device.

Figure 3:
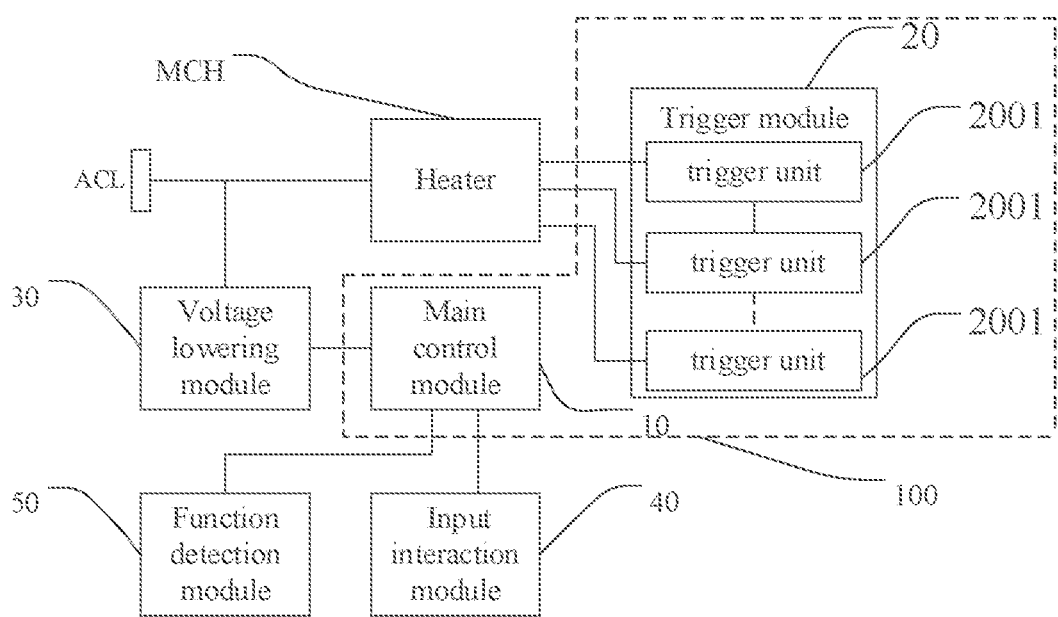
FIG. 3 is a schematic diagram of the temperature control circuit for a hair penning device according to a second preferable embodiment of the present application.

Of course, in other embodiments, such as those shown in FIG. 3, the trigger module may also include more trigger units 2001, such as the trigger module can include at least three trigger units 2001. When the main control module 10 detects that one of the trigger units fails 2001, it controls the other trigger units 2001 to be switched off and stops the heater from heating. One additional trigger unit 2001 will slightly increase the cost of the temperature control circuit 100, but the circuit reliability will also be higher. The number of trigger units would not be limited to a specific number as long as the MCU chip has enough I/O ports to receive the trigger information and output control signals.

Based on the temperature control circuit 100 of the hair perming device, the present application has further provided a hair perming device (referring FIG. 1-2) which comprises a power supply input ACL, a heater MCH and a temperature control circuit 100, wherein the heater MCH is connected in series between the power supply input ACL and the temperature control circuit 100. As the temperature control circuit 100 has been discussed in detail above, it will not be repeated here for concise.

In the specific implementation, the hair penning device can be a hair straightener or a hair curler, or other hair perming device which should be heated for hair styling. The present application is not limited the specific type of the hair penning device.

Please continue to refer to FIGS. 1 and 2, the hair perming device further comprises a voltage lowering module 30 used for lowering a AC voltage to a working voltage of the MCU chip U1 of the hair penning device. One terminal of the voltage lowering module 30 is connected to the power supply input ACL of the hair periling device, and the VCC terminal of the voltage lowering module 30 is connected to a VDD pin of the MCU chip U1.

The voltage lowering module 30 employs a resistance-capacitance voltage lowering and rectification circuit to convert the AC voltage into the DC voltage required for the operation of MCU, thus ensuring the stable operation of MCU chip U1.

Furthermore, the hair perming device further comprises an input interaction module 40 for receiving user control instructions, connecting to a fourth pin (the A6/P06 pin as shown in FIG. 2) of the MCU chip U1 of the hair perming device. The input interaction module 40 is a key function circuit composed of keys and voltage dividing resistors. It controls the functions of the hair perming device by different keys, such as switching on and off, temperature increasing, temperature decreasing, etc.

Furthermore, the hair penning device of the present application further comprises a function detection module 50 for detecting a voltage and frequency. The first terminal of the function detection module 50 is connected to the power supply input ACL, the second terminal of the function detection module 50 is connected to the E2/A4/PO4 pin of the MCU chip U1, and the third terminal of the function detection module 50 is connected to the E11/A3/P03 pin of the MCU chip U1, for detecting the voltage and frequency of AC voltage, thus controlling the working state of the MCU chip U1.

As discussed above, in the present application, two bidirectional silicon controlled rectifiers are employed for solving the risk of uncontrolled temperature resulted by the failure of one of the bidirectional silicon controlled rectifiers, thus avoiding potential danger (such as fire) or damage (such as burning the hair or skin of the customer).

At the same time, the present application realizes the control of temperature which will be out of control, and the double-tube control by detecting the abnormal state of two bidirectional silicon controlled rectifiers, thus ensuring the normal operation of the hair penning device.

The present application uses a few discrete components, which improve the performance of the product and adapt to popularization and use on the premise of increasing lower cost.

It is understandable that for one skilled in the art, the technical solution and concept of the present application can be changed or modified, and all such changes and modifications should fall within the protection scope of the present application.

The invention claimed is:

1. A temperature control circuit for a hair perming device electrically connected with a heater of the hair perming device, comprising a main control module and a trigger module, wherein the main control module is configured to control the trigger module to be switched on such that a control signal outputted by the main control module can be sent to the heater for heating, and the main control module is configured to detect a working state of the trigger module, wherein when a failure of the trigger module is detected, the main control module is configured to control the trigger module to be switched off such that a continuous heating of the heater is stopped.

2. The temperature control circuit for a hair perming device according to claim 1, wherein the trigger module comprises two trigger units, and when the main control module detects that one of the two trigger units fails, the other one trigger unit is controlled to be switched off by the main control module, such that the continuous heating of the heater is stopped.

3. The temperature control circuit for a hair perming device according to claim 2, wherein the two trigger units comprise a first trigger unit and a second trigger unit, wherein a first terminal of the first trigger unit is connected to the main control module and a first terminal of the second trigger unit is also connected to the main control module, a second terminal of the first trigger unit is grounded, and a third terminal of the first trigger unit is connected to a second terminal of the second trigger unit, while a third terminal of the second trigger unit is connected to the heater.

4. The temperature control circuit for a hair perming device according to claim 3, wherein the first trigger unit comprises a first resistor, a second resistor, a first capacitor, a second capacitor and a first bidirectional silicon controlled rectifier, wherein a first terminal of the first resistor is the first terminal of the first trigger unit which is connected to a first control terminal of the main control module, a second terminal of the first resistor is connected to a control electrode of the first bidirectional silicon controlled rectifier, a first terminal of the second capacitor and a first terminal of the second resistor via the first capacitor, wherein a second terminal of the first bidirectional silicon controlled rectifier is the second terminal of the first trigger unit which is connected to a second terminal of the second capacitor, a second terminal of the second resistor and a MCH(ceramic heater) detection terminal of the main control module, wherein a first terminal of first bidirectional silicon controlled rectifier is the third terminal of the first trigger unit which is connected to the second terminal of the second trigger unit.

5. The temperature control circuit for a hair perming device according to claim 4, wherein the second trigger unit comprises a third resistor, a fourth resistor, a third capacitor, a fourth capacitor and a second bidirectional silicon controlled rectifier, wherein a first terminal of the third resistor is the first terminal of the second trigger unit which is connected to a second control terminal of the main control module and a second terminal of the third resistor is connected to a control electrode of the second bidirectional silicon controlled rectifier, a first terminal of the fourth capacitor and a first terminal of the fourth resistor via the third capacitor, wherein a second terminal of the second bidirectional silicon controlled rectifier is the second terminal of the second trigger unit which is connected to a second terminal of the fourth capacitor, a second terminal of the fourth resistor and the first terminal of first bidirectional silicon controlled rectifier, wherein a first terminal of the second bidirectional silicon controlled rectifier is the third terminal of the second trigger unit which is connected a first terminal of the heater whose second terminal is further connected to a power supply input of the hair perming device.

6. The temperature control circuit for a hair perming device according to claim 5, wherein the main control module comprises a MCU(Microcontroller Unit) chip and a fifth resistor, wherein a first pin of the MCU chip is the second control terminal of the main control module which is connected to the first terminal of the third resistor, an a second pin of the MCU chip is the first control terminal of the main control module which is connected to the first terminal of the first resistor and an a third pin of the MCU chip is connected to the second terminal of the first bidirectional silicon controlled rectifier via the fifth resistor.

7. The temperature control circuit for a hair perming device according to claim 1, wherein the trigger module comprises at least three trigger units, and when the main control module detects that one of the three trigger units fails, the other trigger units are controlled to be switched off by the main control module, such that the continuous heating of the heater is stopped.

8. A hair perming device comprising a power supply input, a heater and a temperature control circuit, wherein the heater is connected in series between the power supply input and the temperature control circuit, wherein the temperature control circuit comprises a main control module and a trigger module, wherein the main control module is configured to control the trigger module to be switched on such that a control signal outputted by the main control module can be sent to the heater for heating, and the main control module is configured to detect a working state of the trigger module, wherein when a failure of the trigger module is detected, the main control module is configured to control the trigger module to be switched off such that a continuous heating of the heater is stopped.

9. The hair perming device according to claim 8, wherein the trigger module comprises two trigger units, and when the main control module detects that one of the two trigger units fails, the other one trigger unit is controlled to be switched off by the main control module, such that the continuous heating of the heater is stopped.

10. The hair perming device according to claim 9, wherein the two trigger units comprise a first trigger unit and a second trigger unit, wherein a first terminal of the first trigger unit is connected to the main control module and a first terminal of the second trigger unit is also connected to the main control module, a second terminal of the first trigger unit is grounded, and a third terminal of the first trigger unit is connected to a second terminal of the second trigger unit, while a third terminal of the second trigger unit is connected to the heater.

11. The hair perming device according to claim 10, wherein the first trigger unit comprises a first resistor, a second resistor, a first capacitor, a second capacitor and a first bidirectional silicon controlled rectifier, wherein a first terminal of the first resistor is the first terminal of the first trigger unit which is connected to a first control terminal of the main control module, a second terminal of the first resistor is connected to a control electrode of the first bidirectional silicon controlled rectifier, a first terminal of the second capacitor and a first terminal of the second resistor via the first capacitor, wherein a second terminal of the first bidirectional silicon controlled rectifier is the second terminal of the first trigger unit which is connected to a second terminal of the second capacitor, a second terminal of the second resistor and a MCH(ceramic heater) detection terminal of the main control module, wherein a first terminal of first bidirectional silicon controlled rectifier is the third terminal of the first trigger unit which is connected to the second terminal of the second trigger unit.

12. The hair perming device according to claim 11, wherein the second trigger unit comprises a third resistor, a fourth resistor, a third capacitor, a fourth capacitor and a second bidirectional silicon controlled rectifier, wherein a first terminal of the third resistor is the first terminal of the second trigger unit which is connected to a second control terminal of the main control module and a second terminal of the third resistor is connected to a control electrode of the second bidirectional silicon controlled rectifier, a first terminal of the fourth capacitor and a first terminal of the fourth resistor via the third capacitor, wherein a second terminal of the second bidirectional silicon controlled rectifier is the second terminal of the second trigger unit which is connected to a second terminal of the fourth capacitor, a second terminal of the fourth resistor and the first terminal of first bidirectional silicon controlled rectifier, wherein a first terminal of the second bidirectional silicon controlled rectifier is the third terminal of the second trigger unit which is connected a first terminal of the heater whose second terminal is further connected to a power supply input of the hair perming device.

13. The hair perming device according to claim 12, wherein the main control module comprises a MCU(Microcontroller Unit) chip and a fifth resistor, wherein a first pin of the MCU chip is the second control terminal of the main control module which is connected to the first terminal of the third resistor, a second pin of the MCU chip is the first control terminal of the main control module which is connected to the first terminal of the first resistor and a third pin of the MCU chip is connected to the second terminal of the first bidirectional silicon controlled rectifier via the fifth resistor.

14. The hair perming device according to claim 8, wherein the trigger module comprises at least three trigger units, and when the main control module detects that one of the three trigger units fails, the other trigger units are controlled to be switched off by the main control module, such that the continuous heating of the heater is stopped.

15. The hair perming device according to claim 8, wherein the hair perming device is a hair straightener or a hair curler.

16. The hair perming device according to claim 8, wherein the hair perming device further comprises a voltage lowering module used for lowering a AC voltage to a working voltage of the MCU(Microcontroller Unit) chip of the hair perming device, wherein one terminal of the voltage lowering module is connected to the power supply input of the hair perming device, and another terminal of the voltage lowering module is connected to a VDD pin of the MCU chip.

17. The hair perming device according to claim 8, wherein the hair perming device further comprises an input interaction module for receiving user control instructions, connecting to a fourth pin of the MCU(Microcontroller Unit) chip of the hair perming device.

* * * * *